United States Patent
Strickland et al.

(10) Patent No.: US 7,051,678 B2
(45) Date of Patent: May 30, 2006

(54) ENCLOSED LITTER BOX

(76) Inventors: Sandra A. Strickland, 718 N. Crescent Dr., Beverly Hills, CA (US) 90210; Arieh Halpern, 718 N. Crescent Dr., Beverly Hills, CA (US) 90210

( * ) Notice: Subject to any disclaimer, the term of this patent is extended or adjusted under 35 U.S.C. 154(b) by 0 days.

(21) Appl. No.: 10/816,650

(22) Filed: Apr. 2, 2004

(65) Prior Publication Data
US 2005/0126504 A1  Jun. 16, 2005

Related U.S. Application Data

(60) Provisional application No. 60/530,006, filed on Dec. 15, 2003.

(51) Int. Cl.
*A01K 29/00* (2006.01)
(52) U.S. Cl. ..................................... 119/165
(58) Field of Classification Search ............... 119/161, 119/165, 166; 209/614, 418, 419
See application file for complete search history.

(56) References Cited

U.S. PATENT DOCUMENTS

| | | | |
|---|---|---|---|
| 4,027,625 A | 6/1977 | Wheeler | |
| D245,191 S | 7/1977 | Gore | |
| D248,333 S | 6/1978 | Haugen | |
| D276,752 S | 12/1984 | Kinzie | |
| 4,522,150 A | 6/1985 | Gershman | |
| 4,574,735 A | 3/1986 | Hohenstein | |
| D286,694 S | 11/1986 | O'Rourke | |
| D289,574 S | 4/1987 | Stinner | |
| D298,672 S | 11/1988 | Herbst | |
| D300,967 S | 5/1989 | Conner | |
| D300,968 S | 5/1989 | Conner | |
| 4,858,561 A * | 8/1989 | Springer | 119/165 |
| D312,897 S | 12/1990 | Splane | |
| D331,649 S | 12/1992 | Saja | |
| 5,167,204 A * | 12/1992 | Nussle | 119/166 |
| 5,226,388 A | 7/1993 | McDaniel | |
| D346,887 S | 5/1994 | Desveaux | |
| D350,422 S | 9/1994 | Foster, Sr. | |
| D361,175 S | 8/1995 | VanSkiver | |

(Continued)

OTHER PUBLICATIONS

Copy of International Search Report, completed on Sep. 9, 2005, date of mailing Sep. 28, 2005, International Application No. PCT/US2004/041312, International Filing Date Dec. 9, 2004 ( 2 pgs).

*Primary Examiner*—T. Nguyen
(74) *Attorney, Agent, or Firm*—Christie, Parker & Hale, LLP (57) ABSTRACT

An enclosed litter box having a slidably removable litter tray and an integral rake. The litter box includes an enclosure with an arched top having a compound curved surface. The exterior of the enclosure may be decorated with various motifs. The sliding removable litter tray includes a molded recessed handle in a front protruding surface. An upper rim of the tray includes one or more integral channels for support of a rake. Each channel may include storage and travel limit keying indentations to securely yet removably hold the rake in various positions during storage and use. The litter tray bottom may include a transverse ridge dividing the litter tray into a fresh litter area and a used litter area. By manipulating the rake, a user transfers animal wastes from the fresh litter area to the used litter area for removal.

24 Claims, 11 Drawing Sheets

U.S. PATENT DOCUMENTS

| | | |
|---|---|---|
| D361,649 S | 8/1995 | De La Chevrotiere |
| 5,460,293 A | 10/1995 | Erickson |
| 5,477,812 A * | 12/1995 | Waters ............... 119/163 |
| D366,543 S | 1/1996 | Lopes |
| D370,316 S | 5/1996 | Merino |
| D370,317 S | 5/1996 | Kohus |
| 5,517,947 A | 5/1996 | Christman |
| 5,536,055 A | 7/1996 | Kohn |
| D372,813 S | 8/1996 | Walter |
| D377,549 S | 1/1997 | Long et al. |
| 5,713,302 A * | 2/1998 | Walter ............... 119/165 |
| D392,076 S | 3/1998 | Goemans |
| 5,806,461 A | 9/1998 | Kiera |
| D399,613 S | 10/1998 | O'Rourke et al. |
| D408,599 S | 4/1999 | Vice et al. |
| D421,161 S | 2/2000 | Rogers |
| D425,674 S | 5/2000 | Dykens |
| 6,079,364 A | 6/2000 | Tamba |
| D427,735 S | 7/2000 | Hitchins |
| D428,676 S | 7/2000 | Renforth |
| D432,739 S | 10/2000 | Aloisi |
| D433,544 S | 11/2000 | Nesbit-Yontz |
| 6,202,595 B1 | 3/2001 | Atcravi |
| 6,312,029 B1 | 11/2001 | Renforth |
| 6,378,461 B1 | 4/2002 | Thaler et al. |
| 6,382,131 B1 | 5/2002 | McGivern |
| D463,887 S | 10/2002 | Walter et al. |
| 6,474,267 B1 | 11/2002 | Padgett |
| 6,494,165 B1 | 12/2002 | Asbury |
| D473,352 S | 4/2003 | Neves |
| 6,561,130 B1 | 5/2003 | Sage, Jr. |
| 6,578,807 B1 | 6/2003 | Lipscomb et al. |
| D479,370 S | 9/2003 | Neves |
| 6,615,765 B1 | 9/2003 | Thomas |
| 2003/0217700 A1 * | 11/2003 | Northrop et al. ............ 119/166 |

* cited by examiner

ENCLOSED LITTER BOX

CROSS REFERENCE TO RELATED APPLICATIONS

This application claims the benefit of U.S. Provisional Patent Application entitled "LITTER BOX", 60/530,006 filed Dec. 15, 2003, which is hereby incorporated by reference as if fully stated herein.

BACKGROUND OF THE INVENTION

This invention pertains generally to litter boxes and more particularly to enclosed litter boxes having removable litter trays.

Urban pet owners must often provide sanitary facilities for their pets. For cats especially, these sanitary facilities may include a shallow open box filled with an absorbent material termed "litter". Such an arrangement is known as a litter box. A pet enters the litter box and leaves waste inside the box mixed with the litter. A pet owner must then clean the animal waste from the litter box on a regular basis, often by separating the animal waste from the litter and disposing of the animal waste.

Various improvements in the simple litter box are well known in the art. Most of these improvements include better ways of containing the litter, separating the animal waste from the litter, and disposing of the animal waste. However, very little inventive effort has been directed to incorporating a litter box into an urban household in an aesthetically pleasing yet functional manner even though this is what most consumers want from their household appliances. Most pet owners seek a litter box that is attractive in shape and pattern yet incorporates useful features that speed the process of litter maintenance while minimizing pet owner contact with animal waste.

SUMMARY OF THE INVENTION

An enclosed litter box having a slidably removable litter tray and an integral manual rake is provided. The litter box includes an enclosure with an arched top having a compound curved surface. An exterior surface of the enclosure may be decorated with various motifs. The sliding removable litter tray includes a molded recessed handle in a front protruding surface. An upper rim of the tray includes one or more integral channels for support of the rake. The channels may include storage and travel limit keying indentations to securely yet removably hold the rake in various positions during storage and use. The litter tray bottom may include a transverse ridge dividing the litter tray into a fresh litter area and a used litter area. By manipulating the rake, a user transfers animal wastes from the fresh litter area to the used litter area for removal of the animal waste.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
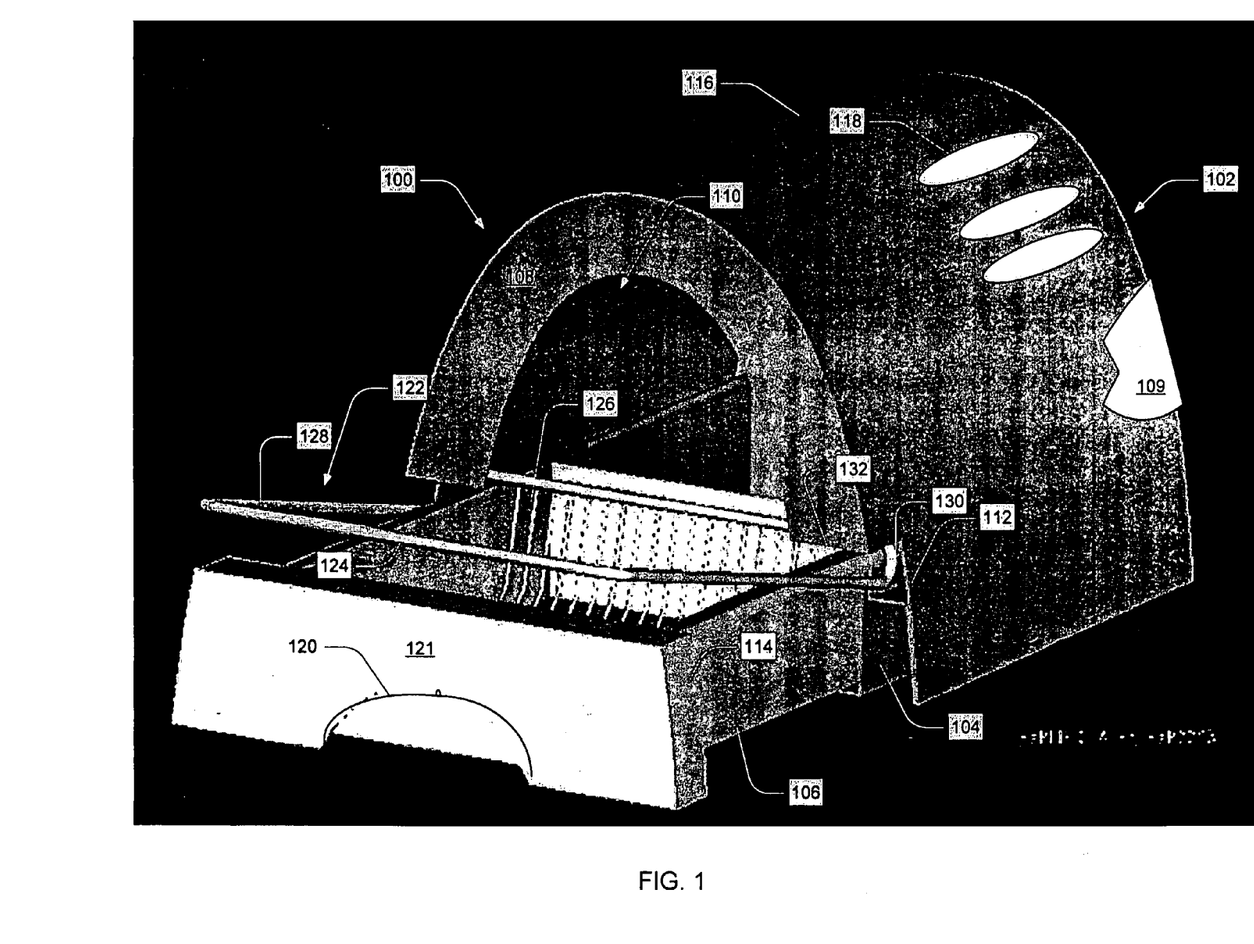
FIG. 1 is a perspective drawing of an enclosed litter box in accordance with an exemplary embodiment of the present invention.
Figure 2:
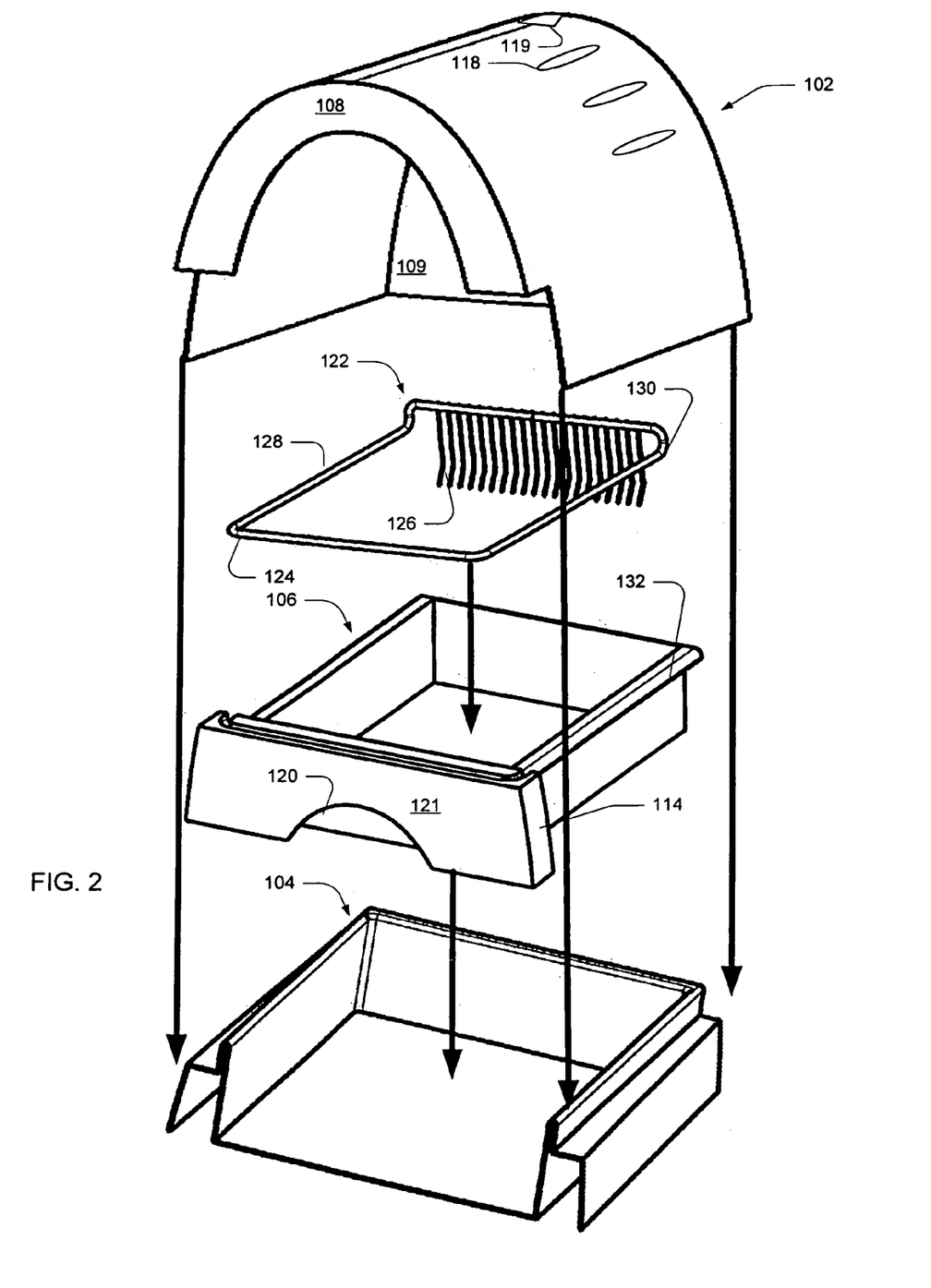
FIG. 2a is an exploded view of the enclosed litter box of FIG. 1.
FIG. 2b is a perspective view of a scoop in accordance with an exemplary embodiment of the present invention.
FIG. 2c is a perspective view of the scoop of FIG. 2b mounted to a triangular notch recess located on an enclosure.
Figure 2A:
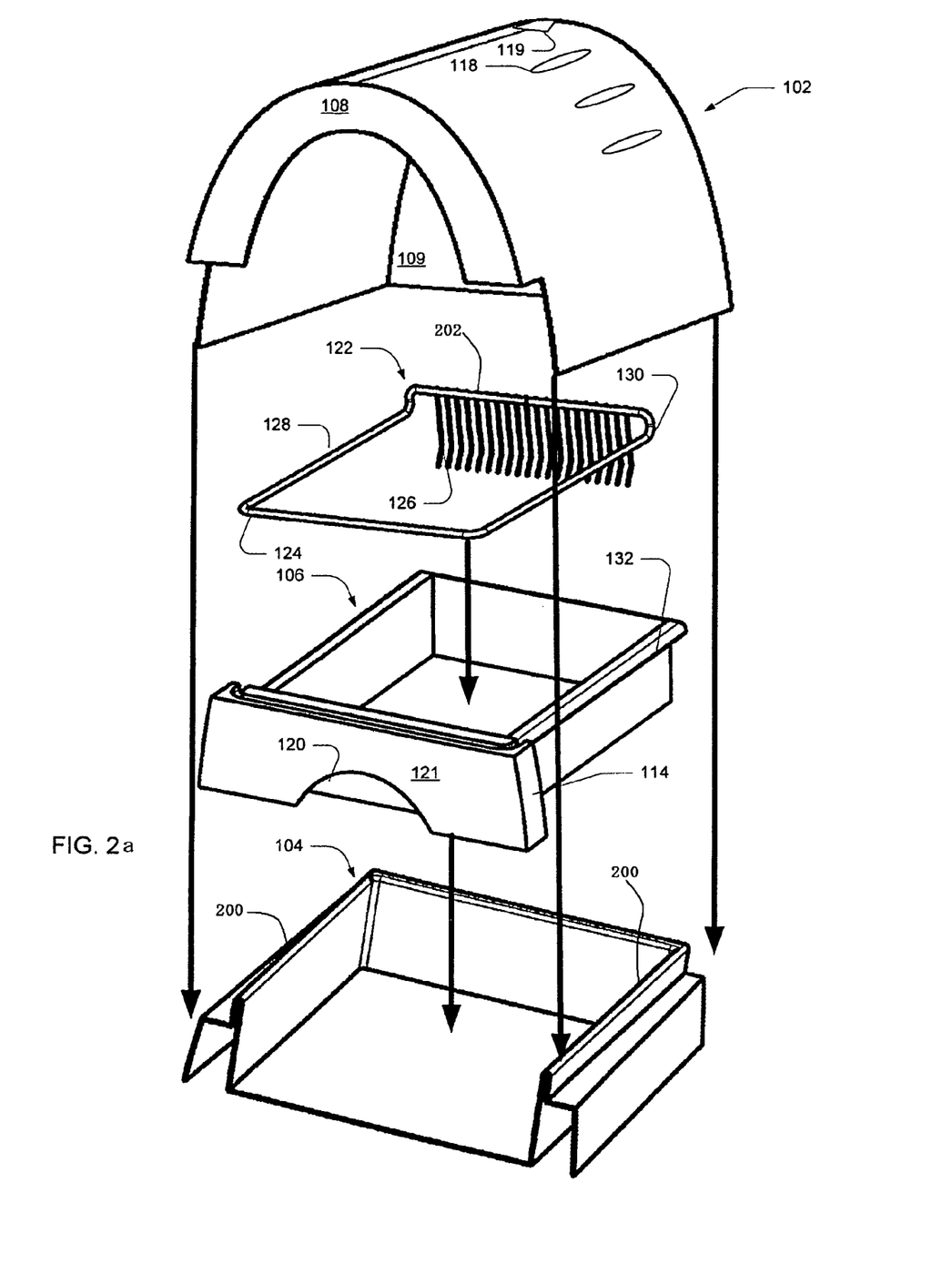

FIG. 1 is a perspective drawing of an enclosed litter box in accordance with an exemplary embodiment of the present invention. FIG. 2a is an exploded view of the enclosed litter box of FIG. 1. In the figures, like numbered elements indicate the same feature of the invention. Referring now to both FIG. 1 and FIG. 2a, an enclosed litter box 100 includes a generally arched enclosure 102 removably mounted onto a chassis 104. A sliding removable litter tray 106 is mounted inside the chassis.

The enclosure includes a front surface 108 and a back surface 109. The front surface has an opening 110 for entry of a small animal. The front surface also includes a notched recess 112 for receiving a front portion 114 of the sliding tray. An upper surface 116 of the enclosure is arched and slopes from the front surface to the back surface creating a compound curve. A rearward portion of the upper surface includes one or more ventilation slots 118 evenly disposed from a left side to a right side of the enclosure. The slots are elongated having a long axis substantially aligned along a longitudinal axis of the enclosure. The openings in the slots may be closed by a cover (not shown) slidably coupled to the enclosure. The enclosure further includes a triangular notched recess 119 for holding an accessory item such as an external rake or scoop.

The sliding tray is removably and slidably coupled to the chassis In one exemplary embodiment, the sliding tray incorporates tray rails that overlap and contact the base rails 200 on the chassis 104. The litter tray includes an integral recessed handle 120 in a protruding front portion of the tray 121 for grasping by a user of the litter tray for removal. The handle has a generally downward facing opening allowing a user to insert their fingers into the litter tray handle without placing any portion of their hand within an interior space of the litter tray.

The enclosed litter box is freestanding in that the litter tray may be removed from the chassis for cleaning without removing the enclosure from the chassis. This obviates the need for a second area to place the enclosure when the litter tray is being cleaned.

A manual rake 122 is positioned within the litter tray. A front or handle portion, also referred to as a second bar, of the rake 124 is coupled to a rear rail or first bar 202 having a tined portion 126 by one or more side rails 128, also referred to as a one or more third bars The handle portion and rear rail combined with the side rails create a rake having a generally rectangular configuration having radiused corners. The tines project from the rear rail of the rake and generally downward into the litter tray. Each side rail of the rake include one or more ear portions 130 that ride over an upper rim 132 of the litter tray. The upper rim 132 may herein be referred to as a tray rail, The ears locate the rake within the litter tray to minimize lateral movement of the rake as the rake is pulled through any litter in the litter tray.

Figure 2B:
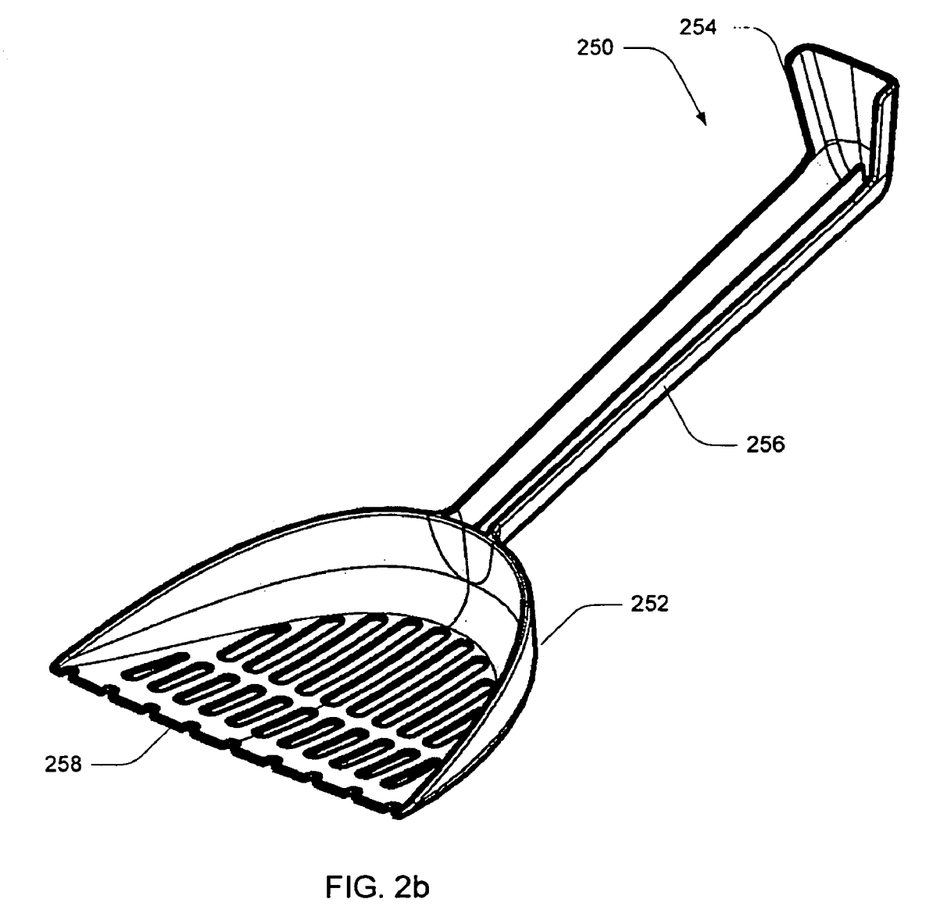

FIG. 2b is a perspective view of a scoop in accordance with an exemplary embodiment of the present invention. A scoop 250 is used to remove animal wastes from the litter tray. The scoop includes a slotted blade portion 252 for holding animal wastes form the litter tray. The slots are wide enough to permit litter to pass through the blade and fall back into the litter tray but not so wide as to allow the animal wastes to fall through. The blade portion further includes a plurality of spaced notches 258. The notches are spaced such that they engage the tined portion 126 of the rake 122 (both of FIG. 2a) and may be used to clean the rake using a combing motion. The scoop further includes a handle portion 256 terminating in a triangular shaped hook portion 254 projecting substantially perpendicularly from the handle portion. The hook portion mates with notched recess 119 of enclosure 102 (of FIG. 2a) to form a gravity lock for removably attaching the scoop to the enclosure. The tapered sides of the hook mate with the tapered sides of the notched recess forming a gravity lock preventing the hook from sliding out of the notched recess.

Figure 2C:
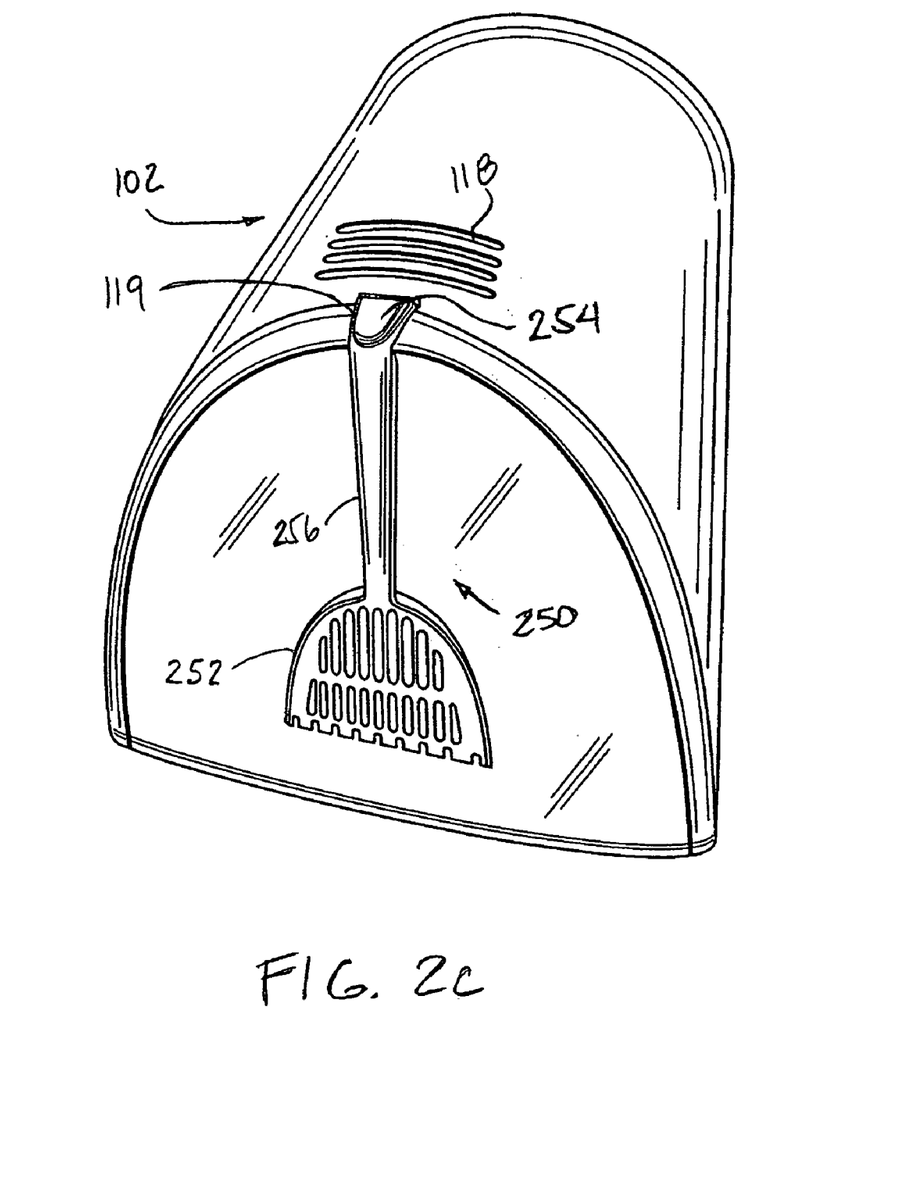

FIG. 2c is a perspective view of the scoop 250 of FIG. 2b mounted to a triangular notch recess 119 located on the enclosure 102. More specifically, the triangular hook portion 254 comprises two side surfaces that are non-parallel (i.e., tapered similar to two sides of a triangle) at the end of the handle portion 262. With reference to FIG. 2, the enclosure 102 incorporates a triangular notched recess 119 having a corresponding shape as the triangular hook portion 254 on the scoop 250. The tapered surfaces of the hook portion 254 on the scoop mate with the tapered sides on the triangular notched recess 119 on the enclosure 102 to form a gravity lock preventing the hook from sliding out of the notched recess. To remove the scoop 250 from the enclosure 102, the scoop 250 needs to be lifted so that the hook disengages from the notched recess.

Figure 3:
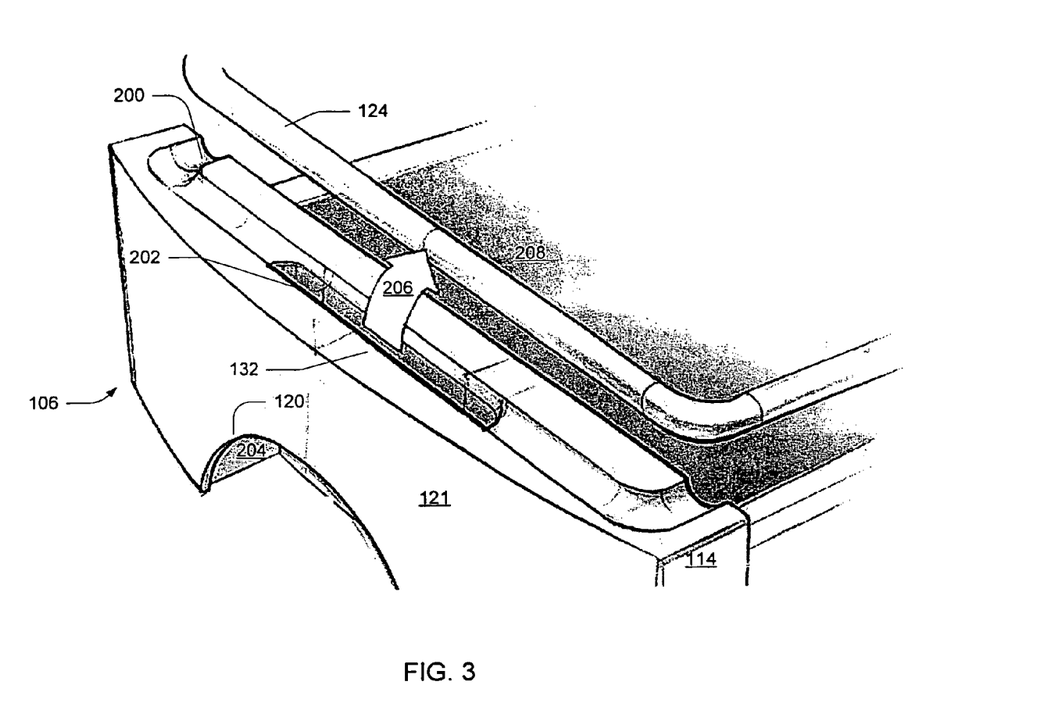
FIG. 3 is a detail drawing of a rake grab feature for an enclosed litter box in accordance with an exemplary embodiment of the present invention.

FIG. 3 is a detail drawing of a rake grab feature for an enclosed litter box in accordance with an exemplary embodiment of the present invention. The removable litter tray 106 includes a groove 200 running longitudinally along the top rim portion 132 of the protruding portion 114 of the litter tray. The groove receives the handle portion 124 of the removable rake 122 while the rake is resting in the litter tray and serves as a storage key indention holding the rake in place. One portion of the groove includes an opening 202 passing from a bottom surface of the groove into an interior portion 204 of the recessed handle 120. When a user wants to grasp the rake by its handle portion, a user inserts their fingers into the recessed handle and up through the opening between the interior portion of the handle and the bottom of the groove. The user may then push (206) the handle of the rake, thus dislodging the rake out of the groove allowing the user to grasp the handle. This allows a user to retrieve the rake without touching an interior portion 208 of the litter tray.

Figure 4:
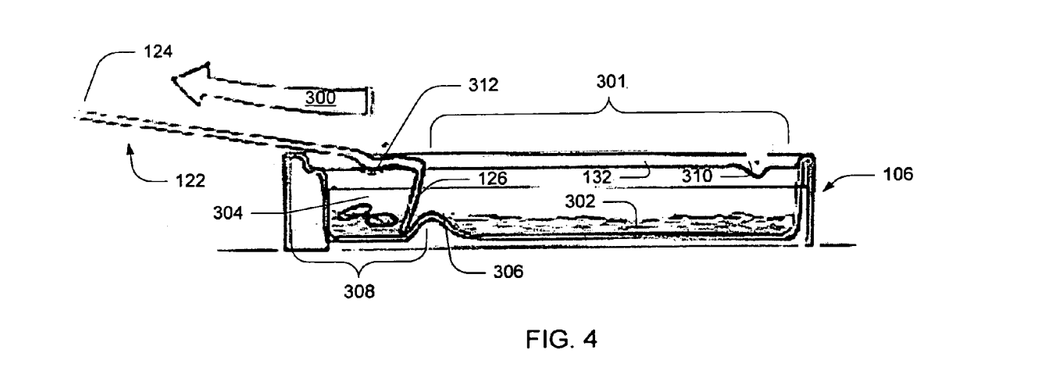
FIG. 4 is a partial cross-section of a removable litter tray and rake in accordance with an exemplary embodiment of the present invention.

FIG. 4 is a partial cross-section of a removable litter tray and rake in accordance with an exemplary embodiment of the present invention. To use the rake 122, a user partially slides the removable litter tray 106 out of the enclosure (not shown). The user then grasps the rake by a handle portion 124 and pulls (300) the rake across a fresh litter portion 301 of the litter tray. As the user pulls the rake, the tines of the rear portion 126 of the rake rest on a bottom surface 302 of the litter tray. As the rake is moved, the tines collect animal waste 304 from the fresh litter portion while allowing the litter to pass through the tines. When the tines encounter a transverse ridge 306 in the bottom surface of the litter try, the tines and rake are urged upward out of the fresh litter portion into a used litter portion 308 of the tray. A user then uses a scoop or other device to remove the animal waste from the used litter portion of the litter tray.

In one embodiment of a litter tray in accordance with the present invention, the upper rim 132 of the litter tray includes one or more storage key indentations 310. The storage key indentions provide a positive tactile indication to the user that the rake has been placed into the rake's storage position on the top rim of the litter tray. The storage key indentions further serve to secure the rake in the storage position. The top rim of the litter tray further includes one or more usage key indentations 312. The usage key indentions provide a tactile indication to the user that the rake has reached the end of its travel position and that the animal wastes have been transferred to the used litter portion of the litter tray. The usage key indentions further provide a means to limit the travel of the rake through the litter in the litter tray.

Figure 5:
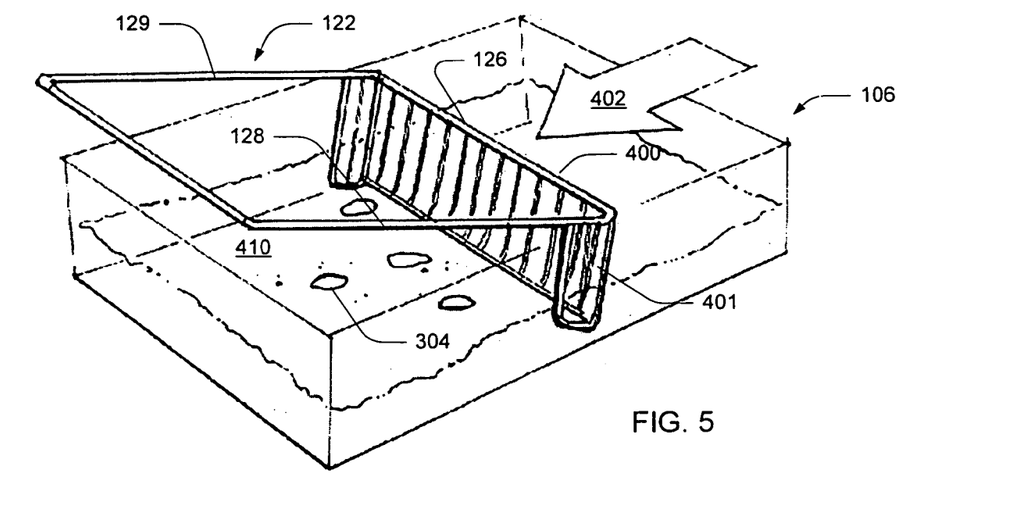
FIG. 5 is a perspective drawing of the use of a combination rake and scoop in a raking motion in accordance with an exemplary embodiment of the present invention.
Figure 6:
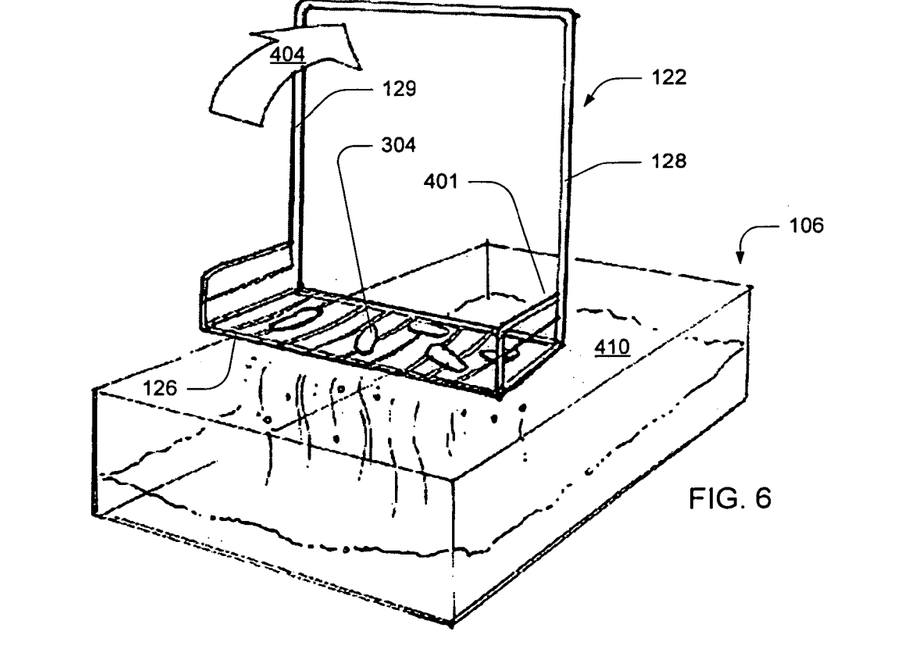
FIG. 6 is a perspective drawing of the use of a combination rake and scoop in a scooping motion in accordance with an exemplary embodiment of the present invention.

FIG. 5 and FIG. 6 are perspective drawings of the use of a combination rake and scoop in accordance with an exemplary embodiment of the present invention. The tined portion 126 of the rake may be fully extended across a back rail 400 of the rake and then extend partially along the side rails, 128 and 129, of the rake thus forming one or more side tined portions 401 on the rake. In a raking mode, a user pulls (402) the tined portion of the rake through the litter 410 in the litter tray 106 while holding the side rails of the rake substantially horizontal during the raking motion. This raking motion separates animal waste 304 from the litter. After the user has separated the animal waste from the litter, the user may then tilt (404) the rake until the side rails are substantially vertical, thus supporting the animal waster on the tined portion of the rake. This allows the user to lift the animal waste out of the litter tray for disposal.

Figure 7:
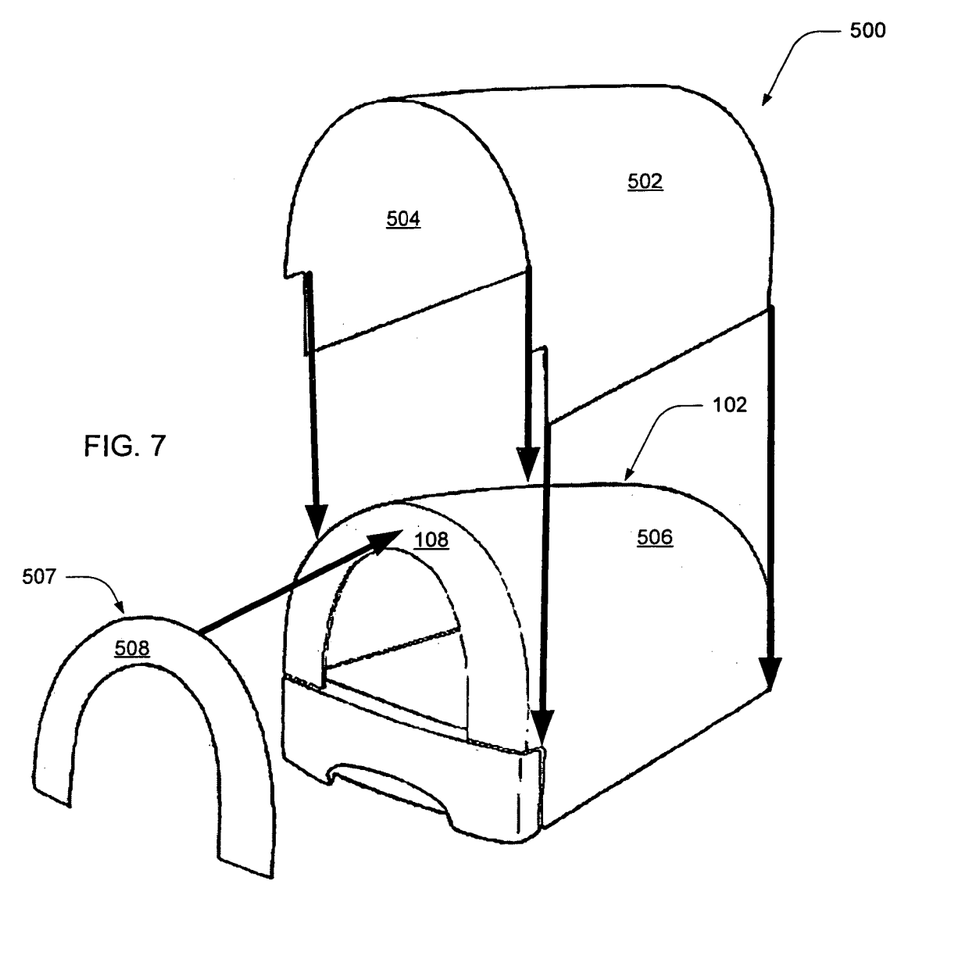
FIG. 7 is an exploded view of a decorative label affixed to an enclosure of an enclosed litter box in accordance with an exemplary embodiment of the present invention.

FIG. 7 is an exploded view of a decorative label affixed to an enclosure of an enclosed litter box in accordance with an exemplary embodiment of the present invention. An upper decorative label 500 includes an outer surface 502 and an inner surface 504. The outer surface may be printed in a variety of fanciful or decorative motifs. The inner surface is coated with an adhesive material that allows the inner surface of the upper label to adhere to an outer surface 506 on an enclosure 102. A front label, 507 includes an outer surface 508 which is printed in a decorative motif corresponding to the decorative motif of the upper label. The front label includes an inner surface (not shown) that is coated with an adhesive material. The adhesive allows the inner surface of the front label to adhere to a front surface 108 of the enclosure.

During manufacturing, the enclosure is constructed from an injected molded plastic without any decorative elements. The upper label and front label may be created in a conventional printing process to include any type of printable motif. The labels are then affixed to the outer surface of the enclosure to create an attractive outer appearance and pattern for the enclosed litter box.

In one embodiment of an enclosure and label, the enclosure's outer surface includes a background color or pattern. In this embodiment, the label is printed onto a transparent substrate and uses a transparent adhesive. Once applied, the effect of the overall pattern of the enclosed litter box is achieved from the superposition of the printed label pattern onto the background pattern of the enclosure's outer surface which is partially visible through the transparent substrate and adhesive of the label.

Figures 8, 9, 10, 11:
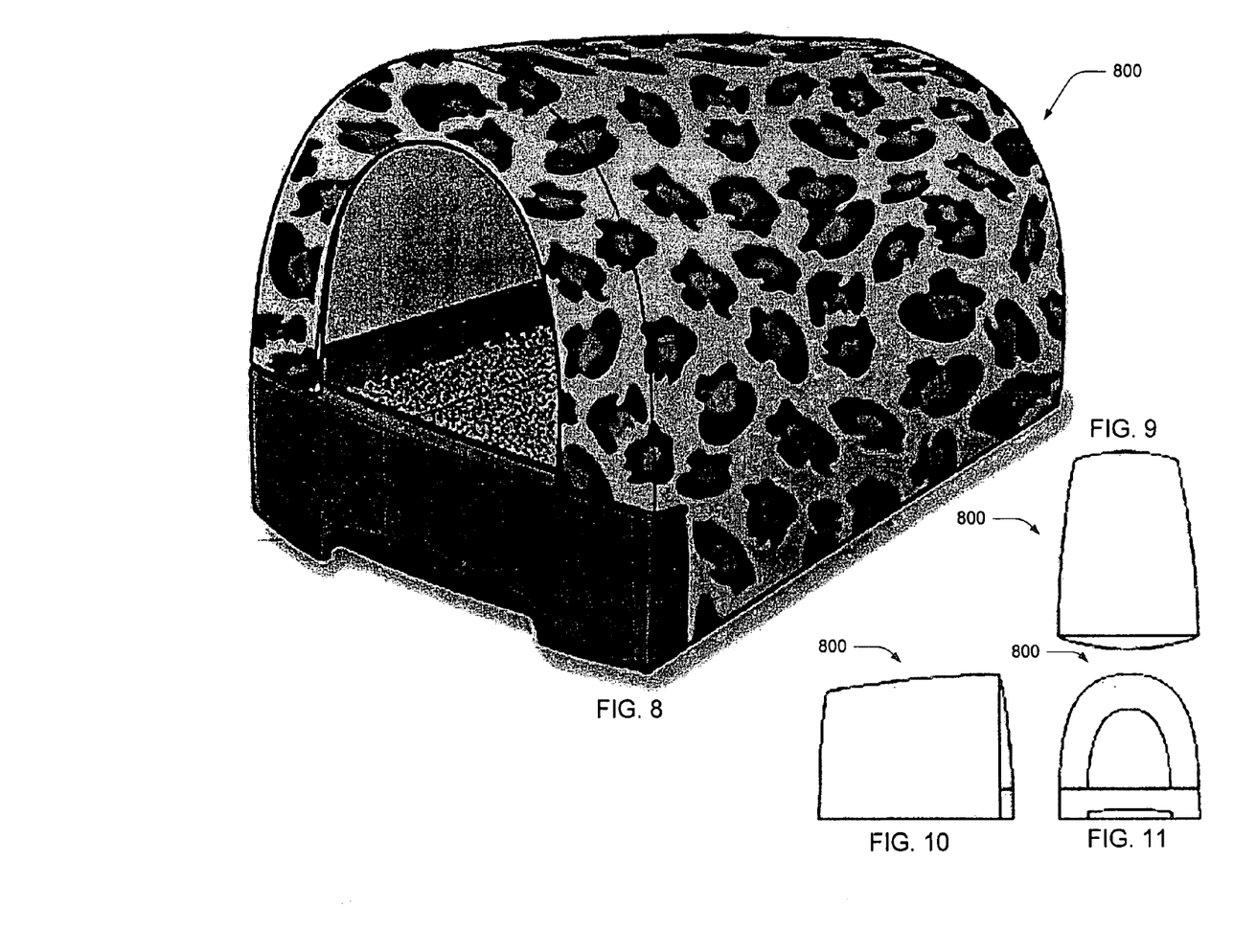
FIG. 8 is a perspective view of an enclosed litter box having a decorative motif in accordance with an exemplary embodiment of the present invention.
FIG. 9 is a top view of the enclosed litter box of FIG. 8.
FIG. 10 is a right side view of the enclosed litter box of FIG. 8.
FIG. 11 is a front view of the enclosed litter of FIG. 8.

FIG. 8 is a perspective view of an enclosed litter box 800 having a decorative motif in accordance with an exemplary embodiment of the present invention. In this embodiment, the litter box enclosure includes a leopard print motif.

FIG. 9 is a top view of the enclosed litter box 800 of FIG. 8.

FIG. 10 is a right side view of the enclosed litter box 800 of FIG. 8.

FIG. 11 is a front view of the enclosed litter box 800 of FIG. 8.

Figure 12:
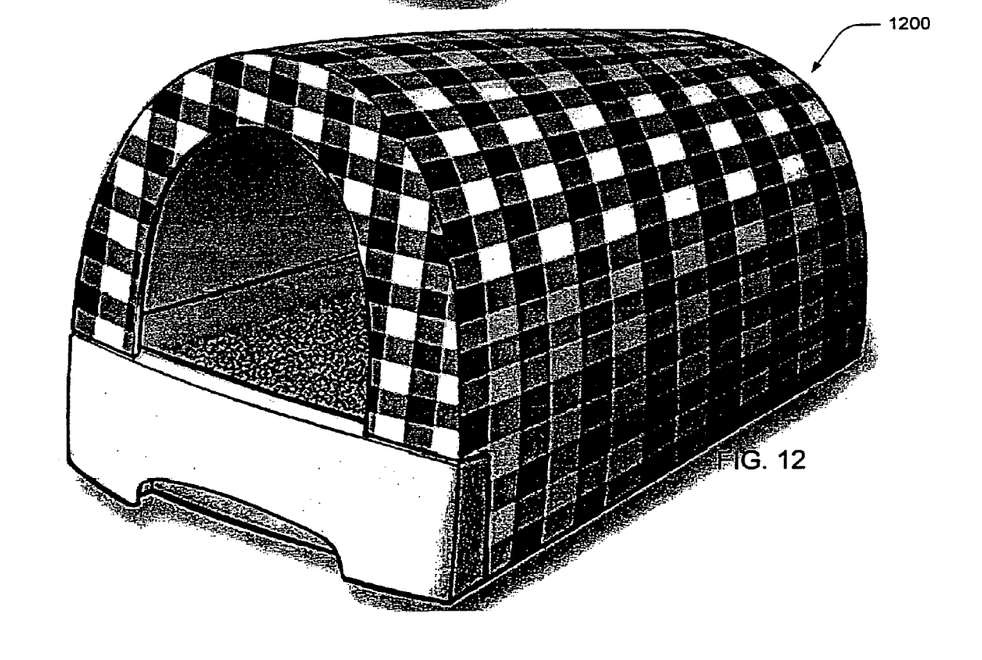
FIG. 12 is a perspective view of an enclosed litter box having a checked print decorative motif in accordance with an exemplary embodiment of the present invention.

FIG. 12 is a perspective view of an enclosed litter box 1200 having a decorative motif in accordance with an exemplary embodiment of the present invention. In this embodiment, the litter box enclosure includes a checked print motif.

Figure 13:
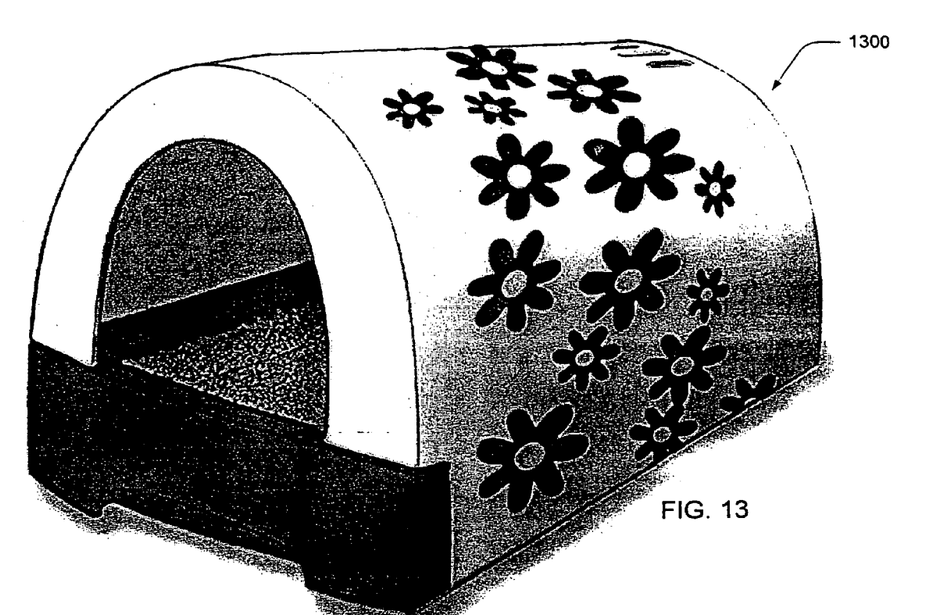
FIG. 13 is a perspective view of an enclosed litter box having a flower print decorative motif in accordance with an exemplary embodiment of the present invention.

FIG. 13 is a perspective view of an enclosed litter box 1300 having a decorative motif in accordance with an exemplary embodiment of the present invention. In this embodiment, the litter box enclosure includes a flower print motif.

Figure 14:
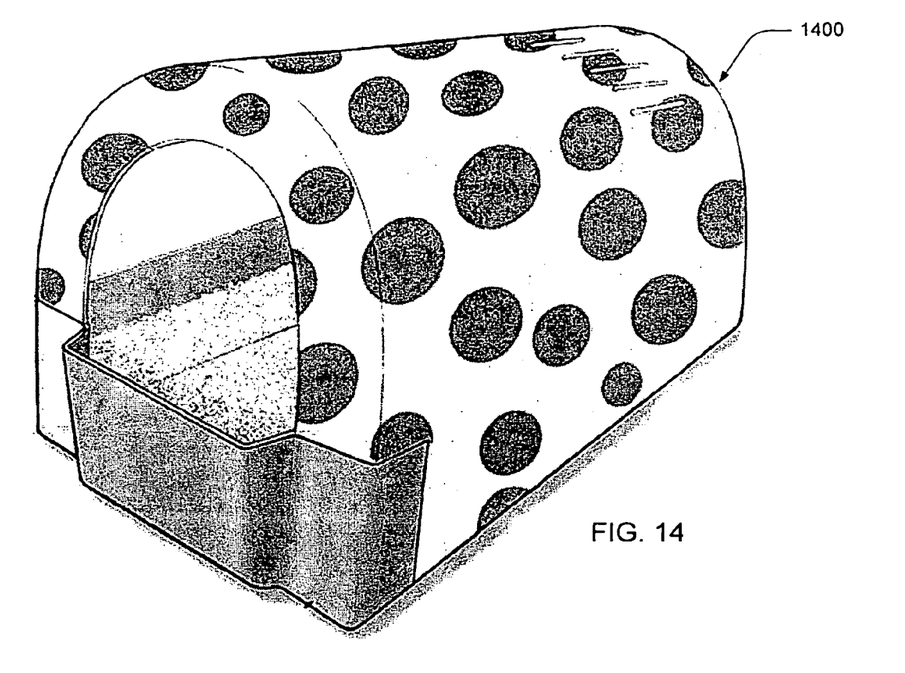
FIG. 14 is a perspective view of an enclosed litter box having a polka dot print decorative motif in accordance with an exemplary embodiment of the present invention.

FIG. 14 is a perspective view of an enclosed litter box 1400 having a decorative motif in accordance with an exemplary embodiment of the present invention. In this embodiment, the litter box enclosure includes a polka dot print motif.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. An enclosed litter box, comprising:
    a chassis comprising a structure comprising two side walls, an end wall, a base comprising a width, an end opening comprising an end edge, and a base rail comprising a width attached to the chass; structure along a lengthwise direction of the two side walls, the base rail width being less than the base width;
    a removable litter tray comprising a first position, a second position, a wall structure comprising a first end, a second end, and a tray rail attached to the wall structure slidably coupled to the chassis such that the first end is closer to the end wall of the chassis than the second end when the litter tray is in the first position inside the chassis before sliding to a second position;
    an enclosure enclosing the removable litter tray;
    wherein the second position is characterized by the first end of the litter tray spaced apart from the end wall of the chassis by a greater distance than when in the first position; and
    wherein the tray rail overlaps and contacts, at least in part, the base rail when the litter tray is in the first position.

2. The enclosed liner box of claim 1, the removable litter tray further comprising an integral handle having a downwardly facing opening.

3. The enclosed litter box of claim 1, the enclosure further including a notched recess for engaging a hook portion of a scoop for scooping litter to form a gravity lock with the scoop.

4. The enclosed litter box of claim 3, wherein the scoop further includes a notched blade for engagement with a tined portion of a manual rake.

5. The enclosed litter box of claim 2, the removable litter tray further comprising:
    a transverse groove on an upper rim of a front portion of the removable litter tray; and
    an opening between a bottom surface of the groove and an interior portion of the integral handle whereby a user may dislodge a handle portion of the manual rake held in the transverse groove.

6. The enclosed litter box of claim 1, wherein the enclosure further comprises:
    an outer surface; and
    an adhesive label having a decorative motif on an outer surface is adhered to the outer surface of the enclosure.

7. The enclosed litter box of claim 1, further comprising a rake comprising a raking end and a handle end.

8. An enclosed litter box, comprising:
    a chassis comprising two side walls, an end opening, and an end wall defining a receiving cavity;
    a slidably removable litter tray comprising a perimeter comprising a plurality of sides defining a tray cavity positioned within the receiving cavity of the chassis
    a rake comprising a raking end comprising a plurality of tines for raking litter coupled to a first bar and a handle end comprising a second bar for handling the rake spaced apart from the first bar by a third bar wherein the rake being positioned within the removable litter tray such that the plurality of tines are located within the tray cavity of the litter tray while the second bar is in contact with a front side of the tray perimeter, which is adjacent the end opening of the chassis;
    an enclosure enclosing the removable litter tray;
    wherein the first bar is positioned at an angle to the third, the third bar is positioned at an angle to the second bar; and
    wherein the second bar and the third bar each comprises a width and a length, and wherein the length is greater in dimension than the width.

9. The enclosed litter box of claim 8, the removable litter tray further comprising an integral handle having a downwardly facing opening for use in pulling the removable litter tray from the chassis.

10. The enclosed litter box of claim 9, wherein the plurality of tines generally point in a first direction and the second bar generally points in a second direction and wherein the first direction is perpendicular to the second direction.

11. The enclosed litter box of claim 10, further comprising means for adhering a decorative label to an outer surface of the enclosure.

12. The enclosed litter box of claim 8, the enclosure further comprising a gravity lock groove for removably attaching a scooper to the enclosure.

13. The enclosed litter box of claim 12, wherein the scooper further comprises a notched blade for engagement with a tined portion of the rake.

14. An enclosed litter box, comprising:
a chassis comprising a receiving cavity;
a removable litter tray positioned in the receiving cavity of the chassis and slidably coupled to the chassis;
a rake comprising a raking end for raking litter comprising at least two tines spaced apart from one another by a first gap and a handle end comprising a handle portion for handling being positioned in the litter tray;
a scooper comprising a scooper handle portion for handling and a scooping portion for scooping comprising at least two indentations defining at least two notches spaced apart from one another by second gap; wherein the first gap and the second gap are generally equal to one another so that the at least two notches align with the at least two tines to enable the at least two indentations to contact the at least two tines to scrape the at least two tines with the scooper.

15. The enclosed litter box of claim 14, wherein the handle portion is connected to two ends of the raking end.

16. The enclosed litter box of claim 14, further comprising a groove on an end of the litter tray.

17. The enclosed litter box of claim 16, wherein the handle portion is coupled to a groove on the litter tray.

18. The enclosed litter box of claim 14, further comprising a handle on an end surface for slidably moving the litter tray.

19. The enclosed litter box of claim 14, further comprising a third tine and a fourth tine.

20. The enclosed litter box of claim 14, wherein the chassis comprises a base and the litter tray comprises a base; wherein the base of the litter tray abuts the base of the chassis.

21. An enclosed litter box, comprising:
a chassis comprising two side walls, an end wall, and an end opening comprising an end edge;
a removable litter tray slidably coupled to the chassis and having a first position and a second position relative to the chassis;
an enclosure coupled to the chassis for enclosing the removable litter tray wherein the enclosure comprising a notch recess comprising two notch surfaces that are non-parallel to one another;
a scooper for scooping comprising a scooping end and a handle end wherein the handle end comprising a hook portion; and
wherein the hook portion is engaged to the notch recess on the enclosure such that the handle end is elevated above the scooping end relative to the removable litter tray.

22. The enclosed litter box of claim 21, wherein the litter tray comprises two side walls, a front wall, a rear wall, and a base defining a tray cavity.

23. The enclosed litter box of claim 21, wherein the hook portion comprises an extension comprising two edges that are non-parallel to one another to engage with the notch recess on the enclosure.

24. The enclosed litter box of claim 21, further comprising a rake located, at least in part, within the removable litter tray.

* * * * *